United States Patent [19]

Yoshida

[11] Patent Number: 5,051,905
[45] Date of Patent: Sep. 24, 1991

[54] SYSTEM AND METHOD FOR AUTOMATICALLY CONTROLLING VEHICLE SPEED TO DESIRED CRUISE SPEED

[75] Inventor: Kiyoshi Yoshida, Kanagawa, Japan

[73] Assignee: Nissan Motor Company, Ltd., Yokohama, Japan

[21] Appl. No.: 310,564

[22] Filed: Feb. 15, 1989

[30] Foreign Application Priority Data

Feb. 16, 1988 [JP] Japan .................. 63-31913

[51] Int. Cl.$^5$ .................. B60K 41/08; B60K 41/18
[52] U.S. Cl. .................. 364/424.1; 74/866
[58] Field of Search .................. 364/424.1, 426.04; 180/176, 177, 178, 179

[56] References Cited

U.S. PATENT DOCUMENTS

| | | | |
|---|---|---|---|
| 4,421,192 | 12/1983 | Ito et al. | 180/179 |
| 4,490,790 | 12/1984 | Shinoda | 364/424.1 |
| 4,591,986 | 5/1986 | Nakajima et al. | 364/426.04 |
| 4,660,672 | 4/1987 | Katou | 180/178 |
| 4,697,478 | 10/1987 | Mastumoto et al. | 180/179 |
| 4,845,621 | 7/1989 | Kawata et al. | 364/426.04 |

FOREIGN PATENT DOCUMENTS 57-121713 7/1982 Japan .

Primary Examiner—Felix D. Gruber
Attorney, Agent, or Firm—Pennie & Edmonds

[57] ABSTRACT

A system and method for automatically controlling a vehicle speed to a desired cruise speed for an automatic transmission equipped vehicle are disclosed in which a shift gear position range of the transmission in which the same gear ratio is charged is extended wider than a normal region determined on the basis of an opening angle of an engine throttle valve and vehicle speed during a control of the opening angle of the throttle valve to maintain the vehicle speed at a set vehicle speed so that a shift down and/or shift up which would normally occur at the same condition is not carried out.

9 Claims, 6 Drawing Sheets

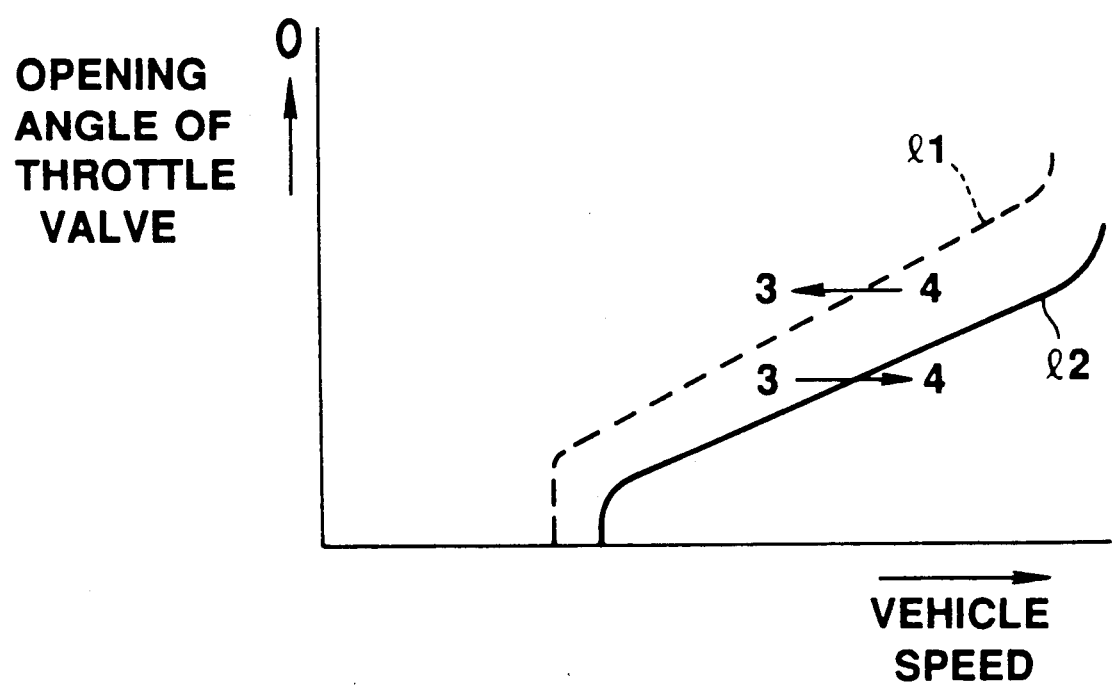

1

SYSTEM AND METHOD FOR AUTOMATICALLY CONTROLLING VEHICLE SPEED TO DESIRED CRUISE SPEED

BACKGROUND OF THE INVENTION (1) Field of the Invention

The present invention relates to a system and method for automatically controlling a vehicle speed to a desired cruise speed applicable to a vehicle in which an automatic transmission is mounted.

(2) Background of the Art

A Japanese Patent Application First Publication sho 57-121713 published July 29, 1982 and counterpart Ito, et al. U.S. Pat. No. 4,421,192 exemplifies one of previously proposed automatic vehicle speed controlling systems for vehicles in which automatic transmissions are mounted.

In the above-identified Japanese Patent Application First Publication, the automatic vehicle speed controlling system includes: (1) vehicle speed signal generating means for outputting a first signal indicative of the vehicle speed; (2) vehicle speed setting means for setting the vehicle speed at which the vehicle is desired to cruise; (3) set vehicle speed signal outputting means for holding the first signal of the vehicle speed signal generating means when the vehicle speed setting means outputs the set signal; (4) vehicle speed comparing means for comparing the output signal of the vehicle speed signal generating means with the output signal of the vehicle speed setting means and outputting a comparison signal according to the result of comparison; (5) throttle valve controlling means for controlling an open and close of the engine throttle valve according to the comparison signal of the vehicle speed comparing means; (6) engine driving means for driving the engine according to the open and close states of the throttle valve; (7) set vehicle speed maintaining detecting means for comparing a set value set according to a gear position of the automatic transmission, the gear position being determined according to the vehicle speed when the vehicle speed setting means sets the vehicle speed at the constant run with a value of the output comparison signal of the vehicle speed comparing means and outputting a second signal when the value of the comparison signal exceeds the set value; and (8) a shift-down circuit which shifts down the gear at the constant run when the second signal from the set vehicle speed maintaining detecting means is outputted.

Furthermore, in the vehicle speed controlling system, a timer is provided which outputs a third signal during a predetermined period of time in response to the second signal derived from the set vehicle speed maintaining detecting means and the shift-down circuit shifts down the gear at the constant run on condition that a logical OR between the second and third signals derived from the set vehicle speed maintaining detecting means and the timer.

In the way described above, the previously proposed automatic vehicle speed controlling system shifts down the gear irrespective of the opening angle of the throttle valve when an absolute value of the vehicle speed difference between the vehicle speed and set vehicle speed exceeds a predetermined vehicle speed difference during the constant run (cruise run). For example, during the run on a slope having a predetermined gradient, a drive signal is outputted to an OD canceling solenoid to carry out the shift down when the speed difference between the set vehicle speed and vehicle speed exceeds the predetermined speed difference. However, during the cruise run on such slopes as in many repetitions of ascending and descending slopes, the shift down is carried out immediately before the run upto a summit of one ascending slope and the shift down is continued during the subsequent descending slope. Therefore, due to an increased continuation of an engine torque, the vehicle speed is increased more than necessary so that a vehicle comfortability is reduced. In addition, a hunting of the vehicle speed change from an overdrive position to a third gear position occurs at an interval of time determined by the timer during the run on a long continued ascending slope. Consequently, the number of times shocks in the gear changes transmitted to the vehicle body occur is increased and, thereby, the vehicle comfortability is reduced.

SUMMARY OF THE INVENTION

It is an object of the present invention to provide a system and method for automatically controlling a vehicle speed to a desired cruise speed which can improve the comfortability of the vehicle during the cruise run at the desired vehicle speed on ascending slopes.

The above-described object can be achieved by providing a system for automatically controlling a vehicle speed to a desired cruise speed, comprising: a) first means for detecting a vehicle speed; b) second means for detecting an operating variable of an engine driving force adjusting mechanism; c) third means for automatically controlling a gear position in an automatic transmission according to set boundary lines of changing a gear ratio based on the operating variable of the engine driving force adjusting mechanism and vehicle speed; d) fourth means for setting the vehicle speed at which the vehicle is desired to cruise and outputting a set command according to the set vehicle speed; e) fifth means for controlling the operating variable of the engine driving force adjusting mechanism so that the vehicle speed is maintained at the set vehicle speed in response to the set command; and f) sixth means for changing at least one of the set boundary lines in such a way that a shift pattern characteristic of a vehicular transmission when making a shift down is transferred toward a lower gear side and/or that when making a shift up is transferred toward a higher gear side during the control of the operating variable by the fifth means.

The above-described object can also be achieved by providing a system for automatically controlling a vehicle speed to a desired cruise speed, comprising: a) first means for detecting a vehicle speed; b) second means for detecting an operating variable of an engine driving force adjusting mechanism; c) third means for automatically controlling a gear position in an automatic transmission according to set boundary lines of changing a gear ratio based on the operating variable of the engine driving force adjusting mechanism and vehicle speed; d) fourth means for setting the vehicle speed at which the vehicle is desired to cruise and outputting a set command according to the set vehicle speed; e) fifth means for controlling the operating variable of the engine driving force adjusting mechanism so that the vehicle speed is maintained at the set vehicle speed in response to the set command; and f) sixth means for changing the set boundary lines of changing the gear ratio shift pattern characteristic applied to a shift down toward a lower gear ratio side and applied to a shift up toward a higher gear ratio side during the control of the operating variable by the fifth means.

The above-described object can also be achieved by providing a system for automatically controlling a vehicle speed to a desired cruise speed, comprising: a) first means for detecting a vehicle speed; b) second means for detecting an operating variable of an engine driving force adjusting mechanism; c) third means for automatically controlling a gear position in an automatic transmission according to set boundary lines of changing a gear ratio based on the operating variable of the engine driving force adjusting mechanism and vehicle speed; d) fourth means for setting the vehicle speed at which the vehicle is desired to cruise and outputting a set command according to the set vehicle speed; e) fifth means for controlling the operating variable of the engine driving force adjusting mechanism so that the vehicle speed is maintained at the set vehicle speed in response to the set command; and f) sixth means for changing the set boundary lines of changing the gear ratio applied to a shift down toward a lower gear side and applied to a shift up toward a higher gear side during the control of the operating variable by the fifth means.

The above-described object can also be achieved by providing a method for automatically controlling a vehicle speed to a desired cruise speed, comprising the steps of: a) detecting a vehicle speed; b) detecting an operating variable of an engine driving force adjusting mechanism; c) automatically controlling a gear position in an automatic transmission according to set boundary lines of changing a gear ratio based on the operating variable of the engine driving force adjusting mechanism and vehicle speed; d) setting the vehicle speed at which the vehicle is desired to cruise and outputting a set command according to the set vehicle speed; e) controlling the operating variable of the engine driving force adjusting mechanism so that the vehicle speed is maintained at the set vehicle speed in response to the set command; and f) extending a shift region in which the same gear ratio is charged wider than a normal region determined on the basis of the operating variable of the engine driving force adjusting mechanism and vehicle speed during the control of the operating variable in the step e).

BRIEF DESCRIPTION OF THE DRAWINGS

FIG. 2 (B) is a characteristic graph of a shift pattern during the cruise run of the vehicle using the automatic vehicle speed controlling system shown in FIG. 1.

FIG. 4 (B) is a schematic diagram for explaining an operation of a previously proposed system disclosed in a Japanese Patent Application First Publication sho 57-121713.

FIG. 5 (A) is a schematic diagram for explaining an operation of the previously proposed automatic vehicle speed controlling system during the cruise run on the long continued ascending slope.

DETAILED DESCRIPTION OF THE PREFERRED EMBODIMENT

Reference will hereinafter be made to the drawings in order to facilitate understanding of the present invention.

Figure 1:
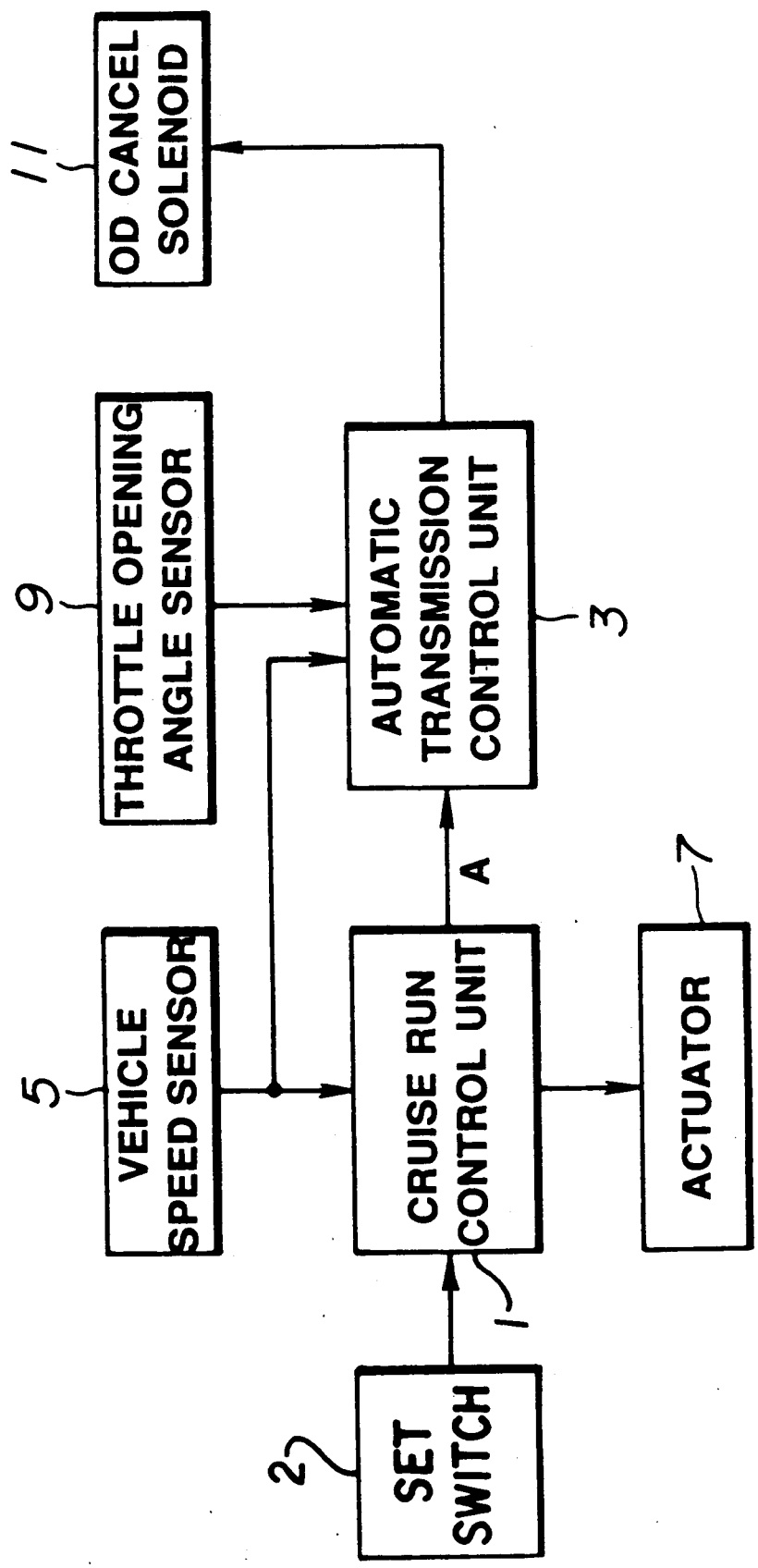
FIG. 1 is a schematic circuit block diagram of a system for automatically controlling a vehicle speed to a desired cruise speed in a preferred embodiment according to the present invention.

FIG. 1 shows a preferred embodiment of an automatic vehicle speed controlling system according to the present invention.

In FIG. 1, a vehicle speed sensor 5 is connected to both cruise speed control unit 1 and automatic transmission control unit (hereinafter, referred to as an automatic gear position control unit) 3. An opening angle sensor 9 of an engine throttle valve is connected to the automatic gear position control unit 3. A throttle actuator 7 is connected to the cruise speed control unit 1 for actuating the throttle valve to control the engine driving force in response to a signal derived from the cruise speed control unit 1. An OD (Over Drive) canceling solenoid 11 is connected to the automatic gear position control unit 3 for changing, e.g., the gear position from an OD range (fourth speed) to a D$_3$ range (third gear).

The automatic gear position control unit 3, e.g., outputs a drive signal to the OD canceling solenoid 11 when a relationship between the vehicle speed and opening angle of the throttle valve is changed according to a boundary line of a shift gear range change line as will be described later so that the shift range is changed from the OD range (fourth gear) to the third range (third speed).

The structures of the cruise speed control unit 1 and throttle actuator 7 are exemplified by Ito, et al. U.S. Pat. No. 4,421,192, U.S. Pat. No. 4,328,776 issued on May 11, 1982, or U.S. patent application Ser. No. 169,218 filed on Mar. 16, 1988, the contents of such Japanese and U.S. Patent documents being hereby incorporated by reference.

The cruise speed control unit 1 receives the vehicle speed from the speed sensor 5 and a vehicle speed set command from a set switch 2 and outputs an actuation signal to the throttle actuator 7 so that the vehicle speed is maintained at the set vehicle speed by the set switch.

Figure 2:
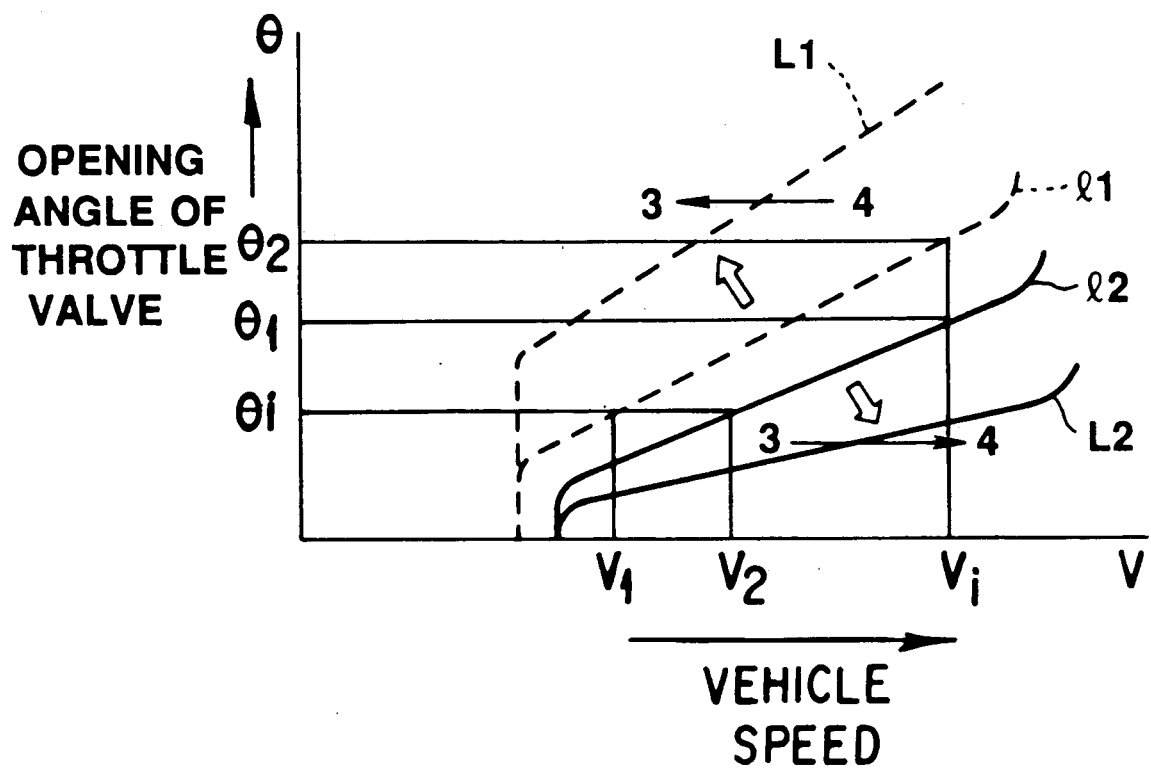
FIG. 2 (A) is a characteristic graph of a shift pattern in a general run of the vehicle using a depression force on an accelerator pedal of the vehicle.

FIG. 2 (A) shows a running diagram for normal operation of the vehicle where the automatic gear position control unit 3 is responsive to the depression force of a driver on an accelerator pedal. A shift pattern $l_1$ denoted by a dot line represents a boundary line of the set gear change for the shift down from the OD range to the third range in a map based on the vehicle speed (horizontal axis) and opening angle of the throttle valve (vertical axis). When the vehicle speed run state is changed from a higher speed side to a lower speed side (right side as viewed from FIG. 2 (A) to a left side as viewed from FIG. 2 (A)) with respect to the set boundary line $l_1$), the automatic transmission control unit 3 outputs the drive signal to the OD canceling solenoid 11 so that the gear is shifted down (OD to third gear).

On the other hand, when the vehicle run state is moved from the lower speed side to the higher speed side through another set boundary line for a shift up ($l_2$) denotes by a solid line of FIG. 2 (A), the automatic gear position control unit 3 outputs a release signal to the OD solenoid 11 (or inhibits the output of the drive signal) to shift up the range of the gear from the third gear ($D_3$) to the OD range. As can be seen in the following example with reference to FIG. 2(B), boundary lines $l_1$, and $l_2$ are determined by a table of values, each corresponding to a preset opening angle of the throttle valve ($\theta_i$) and a vehicle speed ($V_i$), such that for each value $\theta_i$, there are lower and upper value boundaries $V_1$, and $V_2$ respectively such that when the vehicle is operating at speed $V_a$ and $V_1 < V_a < V_2$ there will be no shift change, and when $V_a$ changes so that $V_a < V_1$, there is a downshift and when $V_a$ changes so that $V_a > V_2$ there is an upshift. Similarly, for each value $V_i$, there are lower and upper boundaries $\theta_1$ and $\theta_2$ respectively such that when the vehicle is operating at throttle valve opening angle $\theta_a$, and $\theta_1 < \theta_3 < \theta_2$ there will be no shift change and when $V_s$ changes so that $\theta_s < \theta_1$ there is an upshift and when $\theta_a$ changes so that $\theta_s > \theta_2$, there is a downshift, so that the set of all values ($V_1$, $\theta_2$) determine upper boundary line $l_1$, and the set of all values ($\theta_1$, $V_2$) determine lower boundary line $l_2$.

It is noted that the automatic gear position control unit 3 receives a cruise run signal A from the cruise speed control unit 1. When the cruise run signal A is inputted, the automatic gear position control unit 3 changes the set boundary lines for the shift down and shift up ($l_1$ and $l_2$) toward directions in which the set boundary line for the shift down moves toward a lower geared position and the other set boundary line for the shift up moves toward a higher geared position and the set boundary line for the shift up moves toward a higher geared position, as appreciated from FIG. 2 (B).

In FIG. 2 (B), the set boundary line for the shift down during the cruise run is denoted by the shift pattern $L_1$ in the dot line of the vehicle speed (horizontal line) and the opening angle of the throttle valve (vertical line). That is to say, the set boundary line is placed toward the lower gear position (upward direction in FIG. 2 (B)) with respect to the shift pattern $l_1$ at the time of the general running. An example of this boundary shift is illustrated as follows, with reference to FIG. 2(B). Here, the values ($V_1$, $\theta_2$) which had determined the line $l_1$ in a previous example, are changed; values $V_1$ are decreased and values $\theta_2$ are increased so as to define a new boundary line, $L_1$. Similarly, values ($V_2$, $\theta_1$) which had determined boundary line $l_2$ in a previous example, are changed; values $V_2$ are increased and values $\theta_1$ are decreased, thus defining new boundary line $L_2$. Hence, since the range in which the OD gear position is charged with respect to the vehicle speed becomes wider during the cruise run as compared with the general run, it becomes difficult to shift down when the opening angle of the throttle valve, i.e., the engine load becomes large as in the steep ascending slope.

The set boundary line for the shift up is represented by the shift pattern ($l_2$) denoted by the solid line in the same map of FIG. 2 (B). That is to say, the set boundary line for the shift up is placed toward the high geared position (lower side as viewed from FIG. 2 (B)) with respect to the shift pattern ($L_2$) for the shift up. Hence, the shift up is carried out when the opening angle of the throttle valve becomes narrower as in the cruise run on a steep descending slope with respect to the throttle valve, as compared with the general run through the depression of the throttle valve in FIG. 2 (B).

Therefore, the shift pattern during the cruise run is such that a constant shift region is extended in which no shift down or shift up is carried out, as compared with that in the case of the general run.

Next, an operation of the preferred embodiment will be described.

Figure 6:
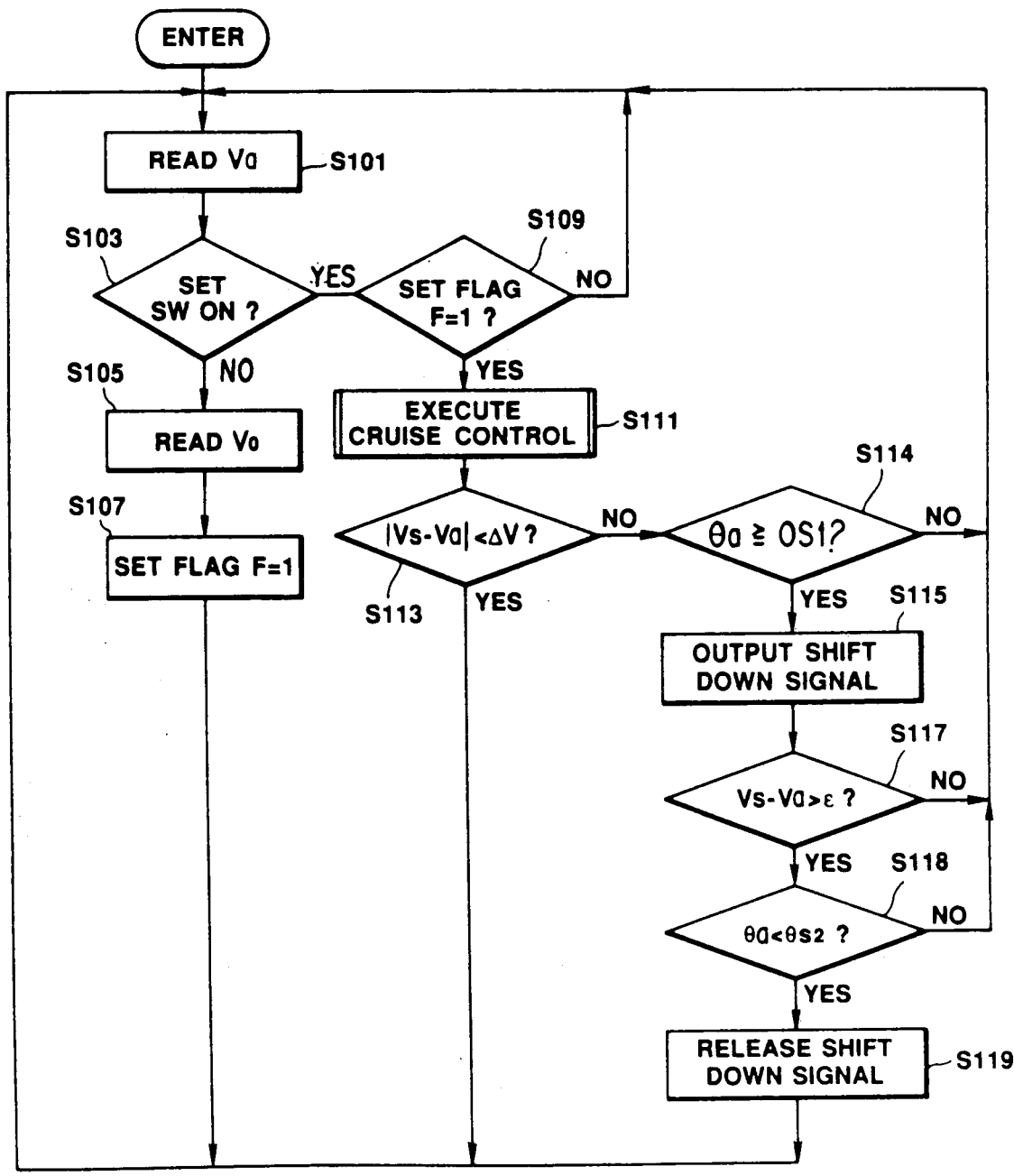
FIG. 6 is an operational flowchart on which a cruise control is executed in a cruise speed control unit with an automatic gear position control unit in the preferred embodiment shown in FIG. 1.

FIG. 6 shows an example of an operational flowchart on which the cruise speed control unit 1 and automatic gear position control unit 3 are executed.

A set vehicle speed $V_s$ is set to a vehicle speed detected by the speed sensor 5 when the vehicle speed becomes the desired vehicle speed and the driver sets the set switch 2 and a set flag is set to 1 in steps S 101 to S 107.

Next, the cruise speed control unit 1 actuates the throttle actuator 7 to maintain the vehicle speed $V_a$ at the set cruise speed $V_s$ so that the vehicle cruises at the set cruise speed $V_s$ in steps S 109 to S 111. At this time, the cruise speed control unit 1 outputs the signal A to the automatic gear position control unit 3, the output signal A being released when a brake is operated or inhibit signal from an inhibitor is outputted.

When the absolute value of the speed difference between the set vehicle speed $V_s$ and vehicle speed $V_a$ exceeds a predetermined value *V ($\Delta V$) and the opening angle of the throttle valve $\theta_a$ exceeds a predetermined angle $\theta_{s1}$ corresponding to the set boundary line for the shift down, a shift down signal is outputted to the automatic gear position control unit 3 in steps S 113 to S 115. The automatic gear position control unit 3 then outputs the drive signal to the OD canceling solenoid 11 so that the shift down from the OD range to the third range is carried out.

Thereafter, if the absolute difference between the set cruise speed $V_s$ and the vehicle speed $V_a$ is below another predetermined value e and the opening angle of the throttle valve $\theta_a$ is below a predetermined value corresponding to the set boundary line for the shift up $\theta_{s2}$, the shift up signal is outputted from the automatic cruise speed control unit 1 to the automatic gear position control unit 3 so that the drive signal to the OD canceling solenoid 11 is released and thus the shift down from the OD range to the third range is carried out in steps S 117, S 118 and S 119.

Figure 3:
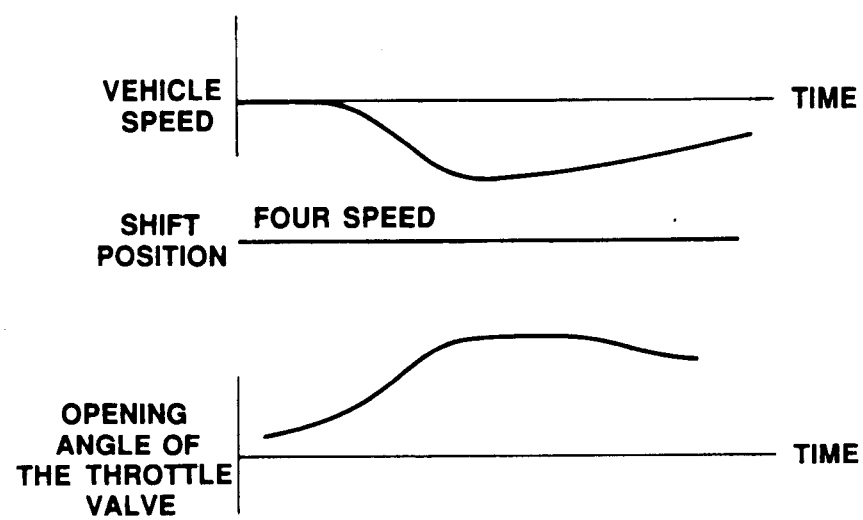
FIG. 3 is a schematic diagram for explaining an operation of the system shown in FIG. 1 during the vehicle run on an ascending slope having a gentle gradient.

FIG. 3 shows characteristic graphs of vehicle speed, four speed, and an opening angle of the throttle valve when the vehicle cruises on an ascending slope having a comparatively slight gradient. Although the vehicle speed is gradually reduced and the opening angle of the throttle valve is gradually increased, the shift range remains unchanged (is in the same range) and no shift down is carried out since the gradient of the ascending slope is gentle. Therefore, an acceleration is carried out only through a control of the opening angle of the throttle valve by means of the actuator 7. Since the gradient is gentle, a sufficient acceleration is carried out.

This makes possible to reduce a frequency of the shift downs when the cruise run on the slope having the gentle gradient. The comfortability of the passenger compartment can be improved. The automatic gear shift position control unit 3 can be achieved by a mere change of a program as shown in FIG. 6.

In addition, since the shift up and/or shift down is not carried out in such a case as shown in FIG. 3, power consumption can be reduced.

Figure 4:
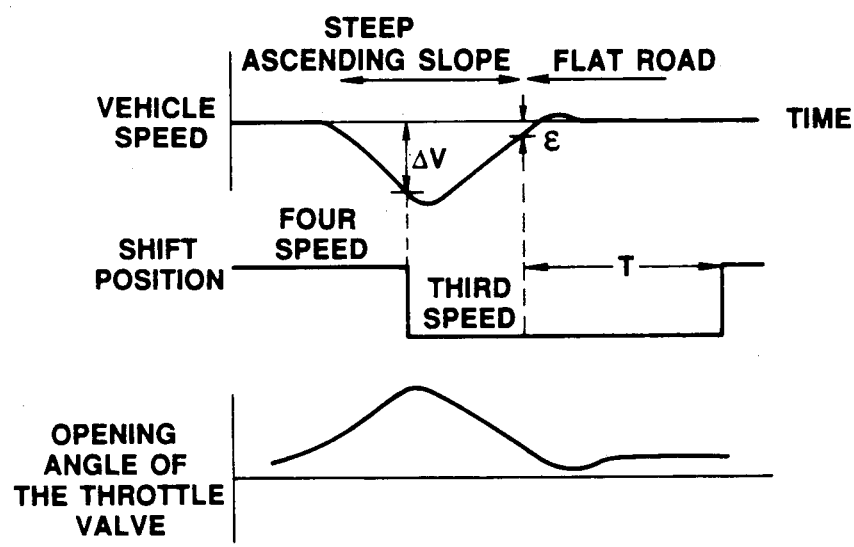
FIG. 4 (A) is a schematic diagram for explaining an operation of the system shown in FIG. 1 during the vehicle run on a steep ascending slope and subsequent run on a flat road.
Figure 4:
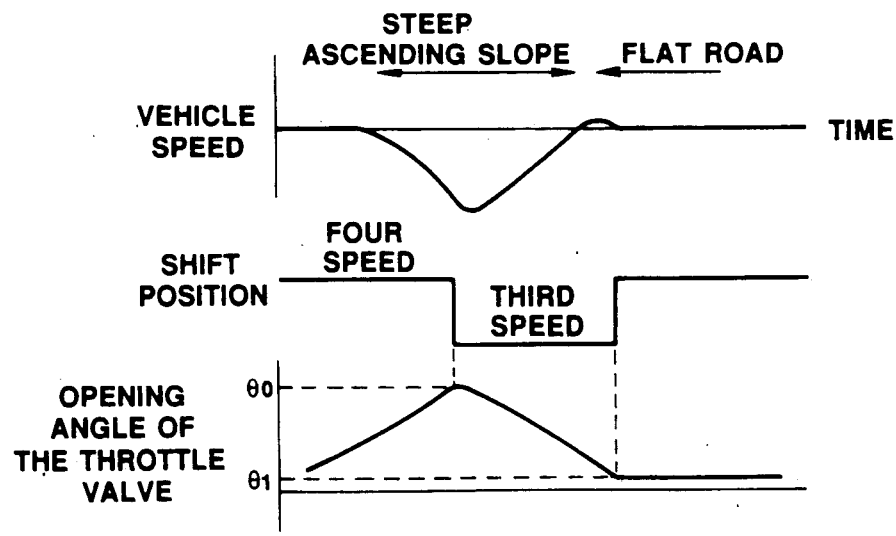

FIGS. 4 (A) and 4 (B) show situations in which both vehicles in which the system disclosed in Ito, et al. U.S. Pat. No. 4,421,192 is mounted and the system shown in FIG. 1 is mounted have respectively run on a steep ascending slope and thereafter on a flat road.

As shown in FIG. 4 (A), the shift down is carried out during the cruise run of the vehicle on the steep ascending slope. Then, when the vehicle speed difference exceeds the predetermined value ε. in the vicinity of the summit of the slope, the timer is operated and the shift down state is continued for the predetermined period of time T. Therefore, the comfortability becomes reduced since the shift down is continued and the vehicle speed is increased more than necessary.

On the contrary, in the system of the preferred embodiment, as shown in FIG. 4 (B), the operation of the OD canceling solenoid 11 is controlled by the automatic gear position control unit 3 irrespective of the operation of the cruise speed control unit 1 but is controlled in accordance with the opening angle of the throttle valve and vehicle speed not dependent on the timer. During the run of the ascending slope, the shift down is carried out and during the run on the flat road immediately after the run on the steep ascending slope, the shift up is carried out so that the vehicle comfortability is not reduced.

Figure 5A:
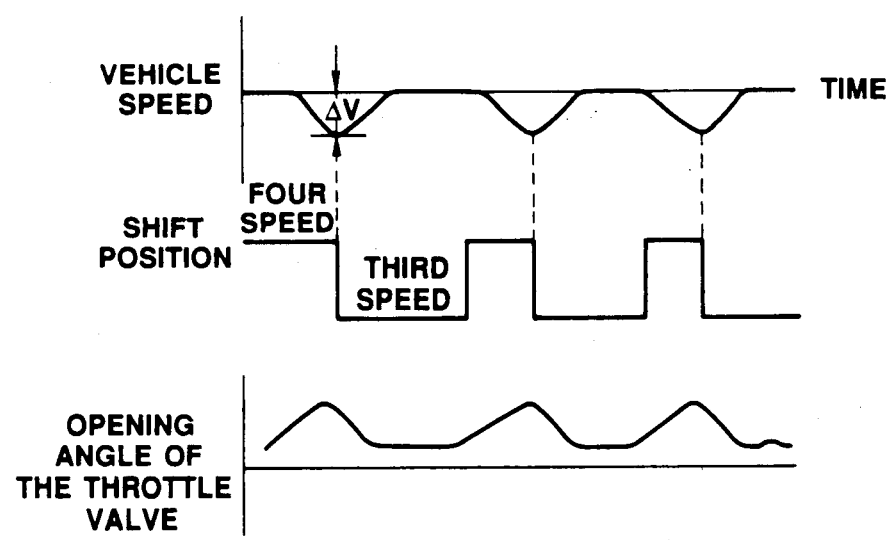
FIG. 5 (B) is a schematic diagram for explaining an operation of the preferred embodiment shown in FIG. 1 during the cruise run on a long continued ascending slope.
Figure 5B:
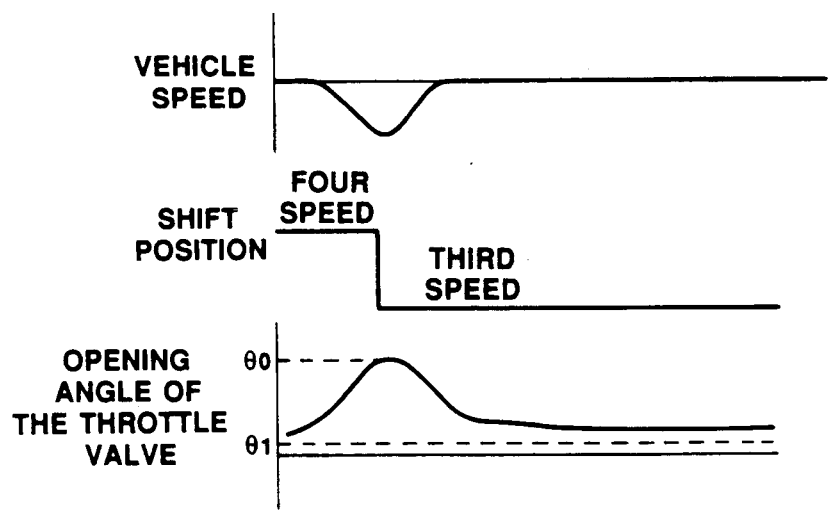

FIGS. 5 (A) and 5 (B) shows situations in which both vehicles in which the system disclosed in the above-identified Ito, et al U.S. Pat. No. 4,421,192 and the system of the preferred embodiment are mounted respectively and have cruised on a long and continued ascending slope having the gradient such that the vehicle speed is reduced only due to the control of the opening angle of the throttle valve through the throttle actuator.

For U.S. Pat. No. 4,421,192, as is shown in FIG. 5 (A), the shift down is carried out during the vehicle speed reduction due to a resistance on the ascending slope and thereafter the vehicle speed is increased. Thereafter, the shift up is carried out after a lapse of the predetermined period of time T caused by the timer operation. Therefore, the engine output torque is decreased due to the shift up and the vehicle speed is reduced although the opening angle of the throttle valve is increased. When the speed difference exceeds the predetermined value of the speed difference delta V, the shift down is again carried out to increase the vehicle speed. In this way, the shift up and shift down are repeatedly carried out so that the vehicle speed is frequently changed. Consequently, the vehicle comfortability is reduced.

On the contrary, as shown in FIG. 5 (B), since the system in the preferred embodiment does not depend on the timer operation, the vehicle speed is settled due to the continued shift down during the run on the slope described above. Consequently, the comfortability is not reduced.

It is noted that at least one or both of the set boundary lines for the shift down and shift up may be changed.

As described hereinabove, since in the automatic cruise controlling system and method according to the present invention the set boundary line for the shift down and/or for the shift up is varied to a lower geared direction and/or to a higher geared position, the vehicle speed range in which the same gear position is not changed is extended, whereby the frequency of the shift change is reduced. A smooth acceleration feeling is achieved so that the vehicle comfortability is improved.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for automatically controlling vehicle speed so as to make said vehicle speed conform to a desired cruise speed, comprising:

means for detecting a vehicle speed;

means for detecting an operating variable of an engine driving force adjusting mechanism;

means for automatically controlling a gear position in an automatic transmission according to preset boundary lines wherein said boundary lines are defined by preset values associated with the operating variable of the engine driving force adjusting mechanism and vehicle speed;

means for setting the vehicle speed at which the vehicle is desired to cruise and outputting a set command according to the set vehicle speed; and means for controlling the operating variable of the engine driving force adjusting mechanism so that the vehicle speed is maintained at the set vehicle speed in response to the set command and for changing at least one of said preset boundary lines in such a way that a shift pattern characteristic of a vehicular transmission when making a down shift is transferred toward a lower gear side and that when making an up shift is transferred toward a higher gear side during the control of the operating variable.

2. A system for automatically controlling a vehicle speed so as to make said vehicle speed conform to a desired cruise speed, comprising:

means for detecting vehicle speed;

means for detecting an operating variable of an engine driving force adjusting mechanism;

means for automatically controlling a gear position in an automatic transmission according to preset boundary lines wherein said boundary lines are defined by preset values associated with the operating variable of the engine driving force adjusting mechanism and vehicle speed and wherein said boundary lines define a region in which said gear ratio does not change;

means for setting the vehicle speed at which the vehicle is desired to cruise and outputting a set command according to the set vehicle speed; and means for controlling the operating variable of the engine driving force adjusting mechanism so that the vehicle speed is maintained at the set vehicle speed in response to the set command and for extending said region in which said gear ratio does not change whereby a shift region is changed so as to be wider than a normal region determined on the basis of the operating variable of the engine driving force adjusting mechanism and vehicle speed during the control of the operating variable.

3. A system as set forth in claim 2, wherein said controlling means changes one of the set boundary lines which is applied to a down shift from an OD range to a third gear range toward a lower geared side.

4. A system as set forth in claim 3, wherein said controlling means changes one of the set boundary lines which is applied to an up shift from the third gear range to a OD range toward a higher geared side.

5. A system as set forth in claim 4, wherein the operating variable of the engine driving force adjusting mechanism is an opening angle of an engine throttle valve.

6. A system set forth in claim 5, wherein said controlling means drives an OD canceling solenoid to change the gear position from the OD range to the third gear range when a relationship between the opening angle of the throttle valve and vehicle speed exceeds said preset boundary line from a higher speed side to a lower speed side.

7. A system as set forth in claim 6, wherein said controlling means releases the drive of the OD canceling solenoid to change the gear position from the third speed range to the OD range when the relationship between the opening angle of the throttle valve and vehicle speed exceeds the values which define said preset boundary line from the lower speed side to the higher speed side.

8. A system for automatically controlling a vehicle speed so as to make said vehicle speed conform to a desired cruise speed, comprising:

means for detecting vehicle speed;

means for detecting an operating variable of an engine driving force adjusting mechanism;

means for automatically controlling a gear position in an automatic transmission according to preset boundary line, wherein said boundary lines are defined by preset values associated with the operating variable of the engine driving force adjusting mechanism and vehicle speed and wherein said boundary lines define a region in which said gear ratio does not change;

means for setting the vehicle speed at which the vehicle is desired to cruise and outputting a set command according to the set vehicle speed; and means for controlling the operating variable of the engine driving force adjusting mechanism so that the vehicle speed is maintained at the set vehicle speed in response to said set command and for changing said preset boundary lines applied to a down shift toward a lower gear ratio side and applied to an up shift toward a higher gear ratio side during the control of the operating variable.

9. A method for automatically controlling a vehicle speed so as to make said vehicle conform to a desired cruise speed, comprising the steps of:

a) detecting vehicle speed;

b) detecting an operating variable of an engine driving force adjusting mechanism;

c) automatically controlling a gear position in an automatic transmission according to preset boundary lines, wherein said boundary lines are defined by preset values associated with the operating variable of the engine driving force adjusting mechanism and vehicle speed and wherein said boundary lines define a region in which said gear ratio does not change;

d) setting the vehicle speed at which the vehicle is desired to cruise and outputting a set command according to the set vehicle speed;

e) controlling the operating variable of the engine driving force adjusting mechanism so that the vehicle speed is maintained at the set vehicle speed in response to the set command and extending said region in which said gear ratio does not change whereby a shift region is changed so as to be wider than a normal region determined on the basis of the operating variable of the engine driving force adjusting mechanism and vehicle speed during the control of the operating variable.

* * * * *